(12) United States Patent
Russo

(10) Patent No.: US 11,130,653 B1
(45) Date of Patent: Sep. 28, 2021

(54) STRAP WINDING AND STORAGE DEVICE

(71) Applicant: Strap and Stow, LLC, Falmouth, ME (US)

(72) Inventor: Michael Anthony Russo, Falmouth, ME (US)

( * ) Notice: Subject to any disclaimer, the term of this patent is extended or adjusted under 35 U.S.C. 154(b) by 0 days.

(21) Appl. No.: 17/331,691

(22) Filed: May 27, 2021

Related U.S. Application Data

(60) Provisional application No. 63/060,747, filed on Aug. 4, 2020.

(51) Int. Cl.
*B65H 75/44* (2006.01)

(52) U.S. Cl.
CPC ..... *B65H 75/4471* (2013.01); *B65H 75/4492* (2013.01)

(58) Field of Classification Search
CPC .. B65H 75/44; B65H 75/441; B65H 75/4471; B65H 75/4492
See application file for complete search history.

(56) References Cited

U.S. PATENT DOCUMENTS

| | | | |
|---|---|---|---|
| 3,952,965 A * | 4/1976 | Falcon | A01K 89/08 242/396.7 |
| 4,238,086 A | 12/1980 | Brimmeier | |
| 5,975,454 A | 11/1999 | Potter et al. | |
| 6,517,022 B1 * | 2/2003 | Bailey | B65H 75/40 242/388.1 |
| 7,131,608 B2 | 11/2006 | Breeden, III et al. | |
| 8,882,016 B1 * | 11/2014 | Melvin | B65H 75/4471 242/405 |
| 9,925,911 B2 | 3/2018 | Hitsman | |
| 10,023,128 B2 | 7/2018 | Anderson | |
| 2015/0108264 A1 * | 4/2015 | Hawkins | B65H 75/4494 242/395.1 |
| 2018/0289915 A1 * | 10/2018 | Rhyan | B65H 75/40 |

* cited by examiner

*Primary Examiner* — Sang K Kim
(74) *Attorney, Agent, or Firm* — Jeffrey Joyce, Esq.

(57) ABSTRACT

A strap winding a storage device that is configured to store both a strap and a securing device, such as a ratchet, in a convenient and transportable manner.

8 Claims, 20 Drawing Sheets

STRAP WINDING AND STORAGE DEVICE

BACKGROUND INFORMATION

Field of the Invention

The invention relates to strap holders and winding devices

Discussion of Prior Art

Many straps, such as ratchet straps, cam straps, and loop straps, are straps that either have or are attachable to a relatively large securing device or structure on one end. Ratchet straps, also known as tie-downs or tie-down straps, for example, are straps that include a ratchet as a means of tensioning the strap. The ratchet in this instance is a mechanical device that allows continuous linear or rotary motion in only one direction while preventing motion in the opposite direction.

These types of straps are very functional, often used to secure various forms of cargo or equipment during transport. For this purpose, in particular, users often prefer to have one or more ratchet straps stored in their vehicles for whenever the need arises. However, wrapping and storing the straps and securing devices is often challenging and cumbersome as the ratchets are relatively large and the straps require some other mechanism to hold them in a wound position.

As a result, would-be users frequently forgo using such devices. Certain storage cases exist that are able to store such straps and some of those assist a user in pulling or winding the strap into a stowed position. However, all such devices are cumbersome, mechanically complex, and are typically large devices meant to carry a number of straps and devices, e.g. ratchets.

What is needed, therefore, is a mechanically simple device that is able to wind a strap and store the strap and securing device.

BRIEF SUMMARY OF THE INVENTION

The invention is a strap winding and storage device for conveniently storing straps and their securing devices, such as a ratchet strap and a ratchet, that has a mechanically simple winding device that effectively winds the strap around the securing device to secure both in a neat and organized manner that is ready for the next use.

The device includes a case that has is openable and that has at least one opening. For example, a top side of the case may be openable so as to allow a user access to the inside of the compartment, and a side may have an opening so that there may be air flow inside the compartment and so that any debris on the strap or securing device may fall out of the storage device.

Inside the case is a compartment for holding the ratchet that is configured and sized so that the strap may be wound around and stored on outer sides of the storage compartment. A winding mechanism is connected to the storage compartment and extends through a bottom side of the case, the winding mechanism including a winding arm or a handle that is accessible to the user from outside the case and enables the user to wind or rotate the storage compartment.

The strap and ratchet may be placed inside the device in a variety of ways. For example: 1) the ratchet may be placed in the compartment; 2) an end of the strap, which often includes a clip, may be placed beside the ratchet in the compartment with the strap extending out of the device; 3) the top of the case is closed; 4) the winding mechanism is operated to pull the strap into the case.

BRIEF DESCRIPTION OF THE DRAWINGS

The present invention is described with reference to the accompanying drawings. In the drawings, like reference numbers indicate identical or functionally similar elements. The drawings are not drawn to scale.

DETAILED DESCRIPTION OF THE INVENTION

Figure 1:
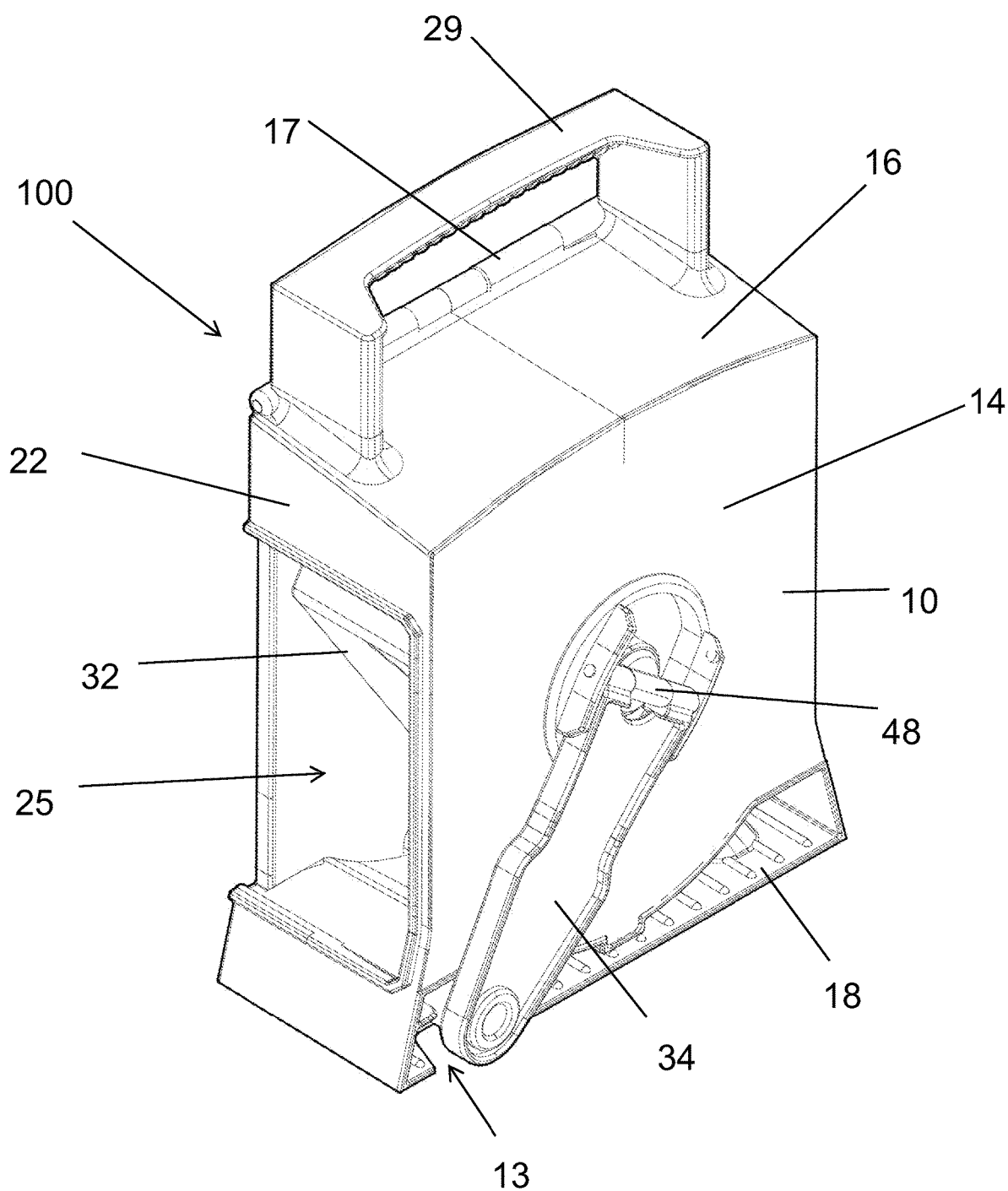
FIG. 1 is a perspective view of the strap winding and storage device according to the invention showing the top, bottom and side of the device in a closed position.
Figure 2:
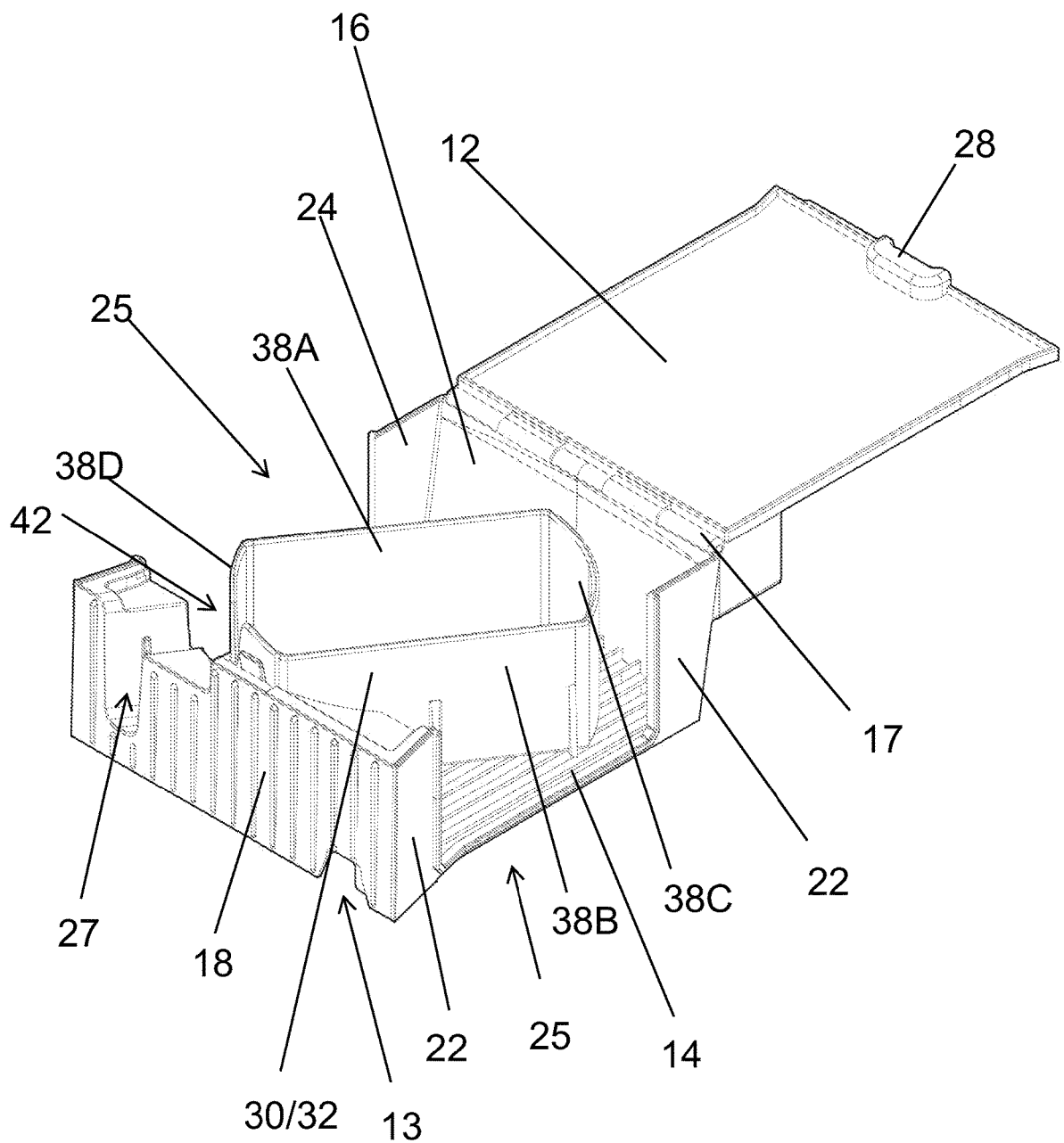
FIG. 2 is a perspective view of the device in an open position showing the bottom, side, and inside of the device.
Figure 3:
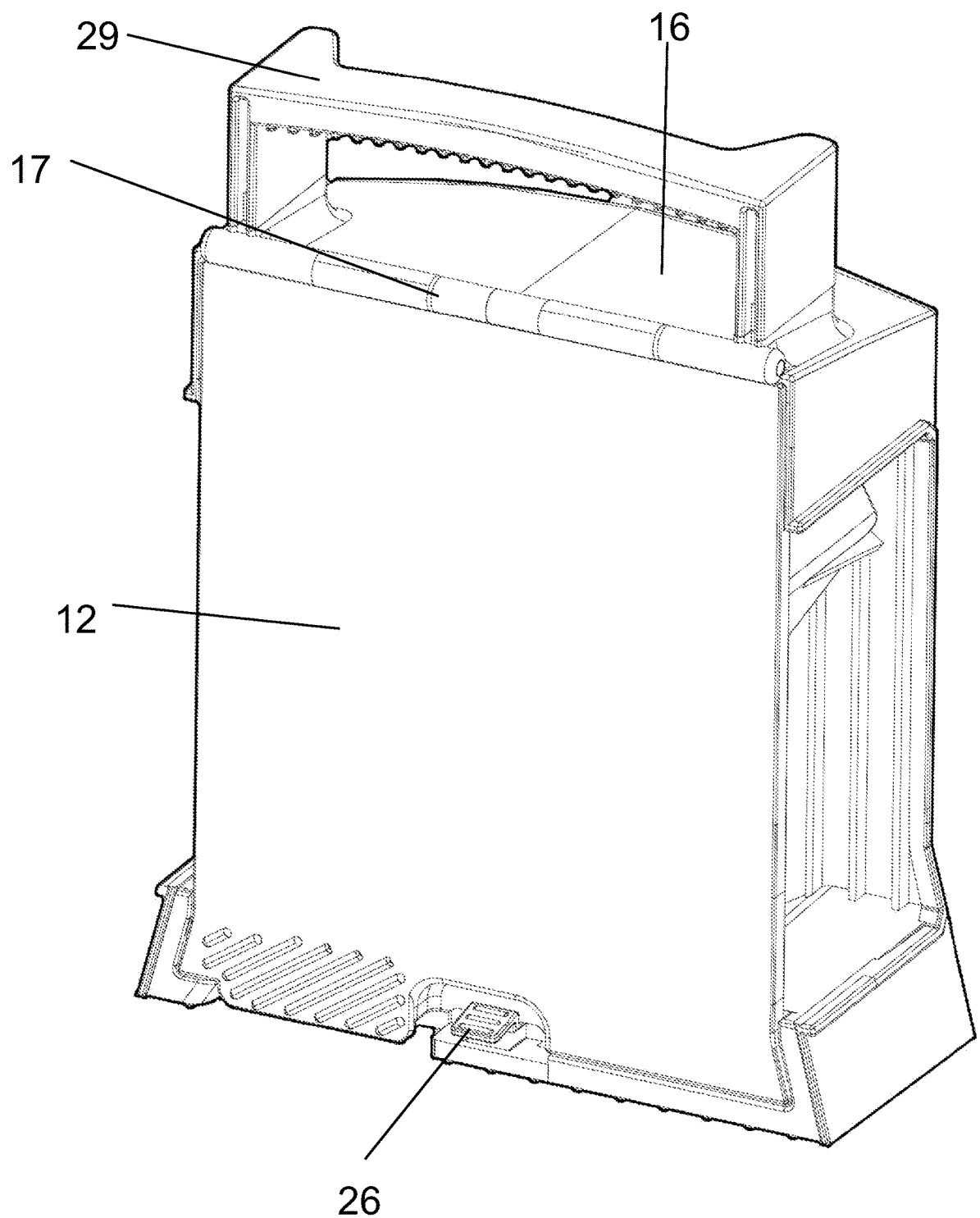
FIG. 3 is a perspective view of the device showing the back side of the device.
Figure 4:
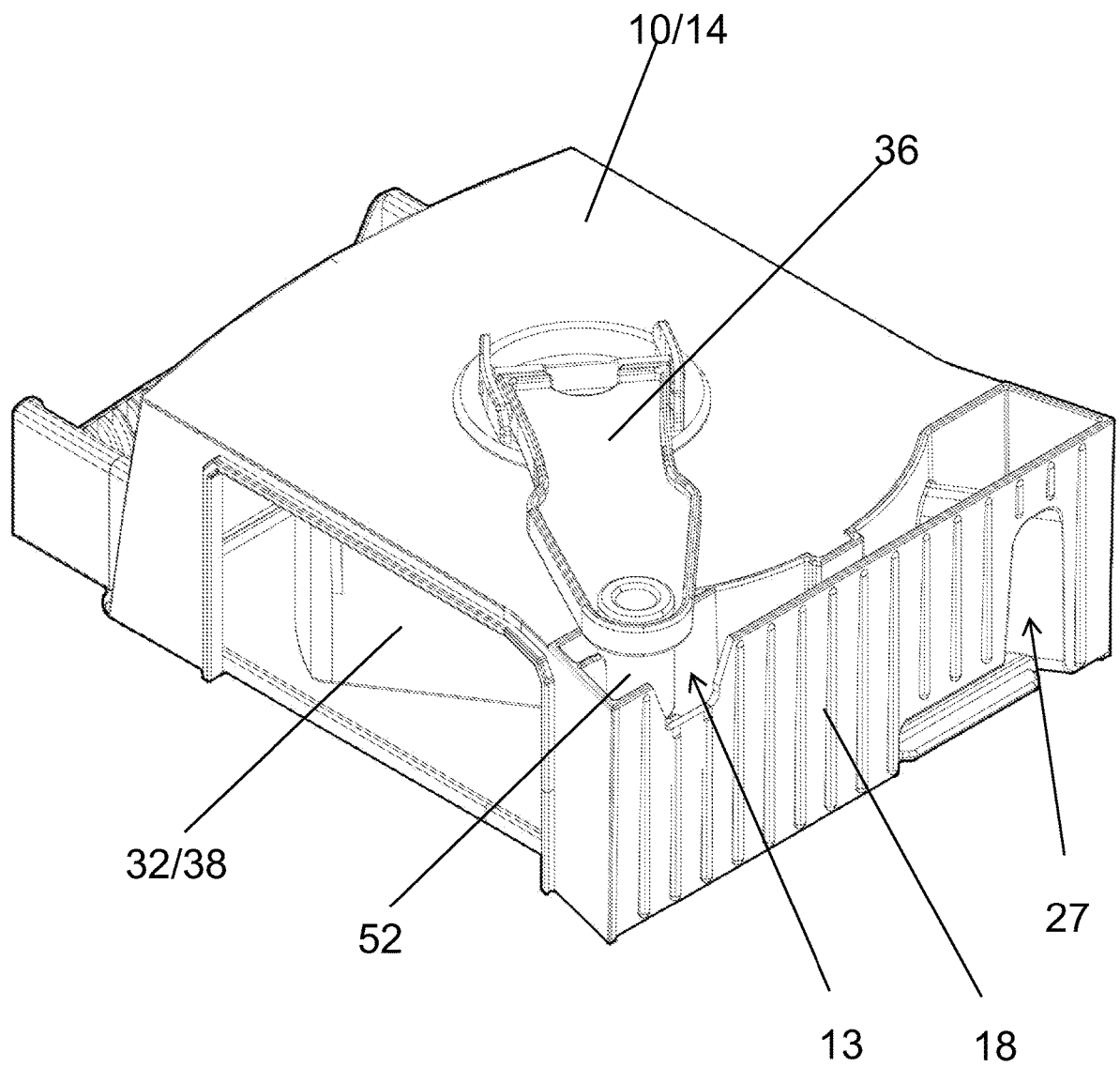
FIG. 4 is a perspective view of the device showing the side and back of the device.
Figure 5:
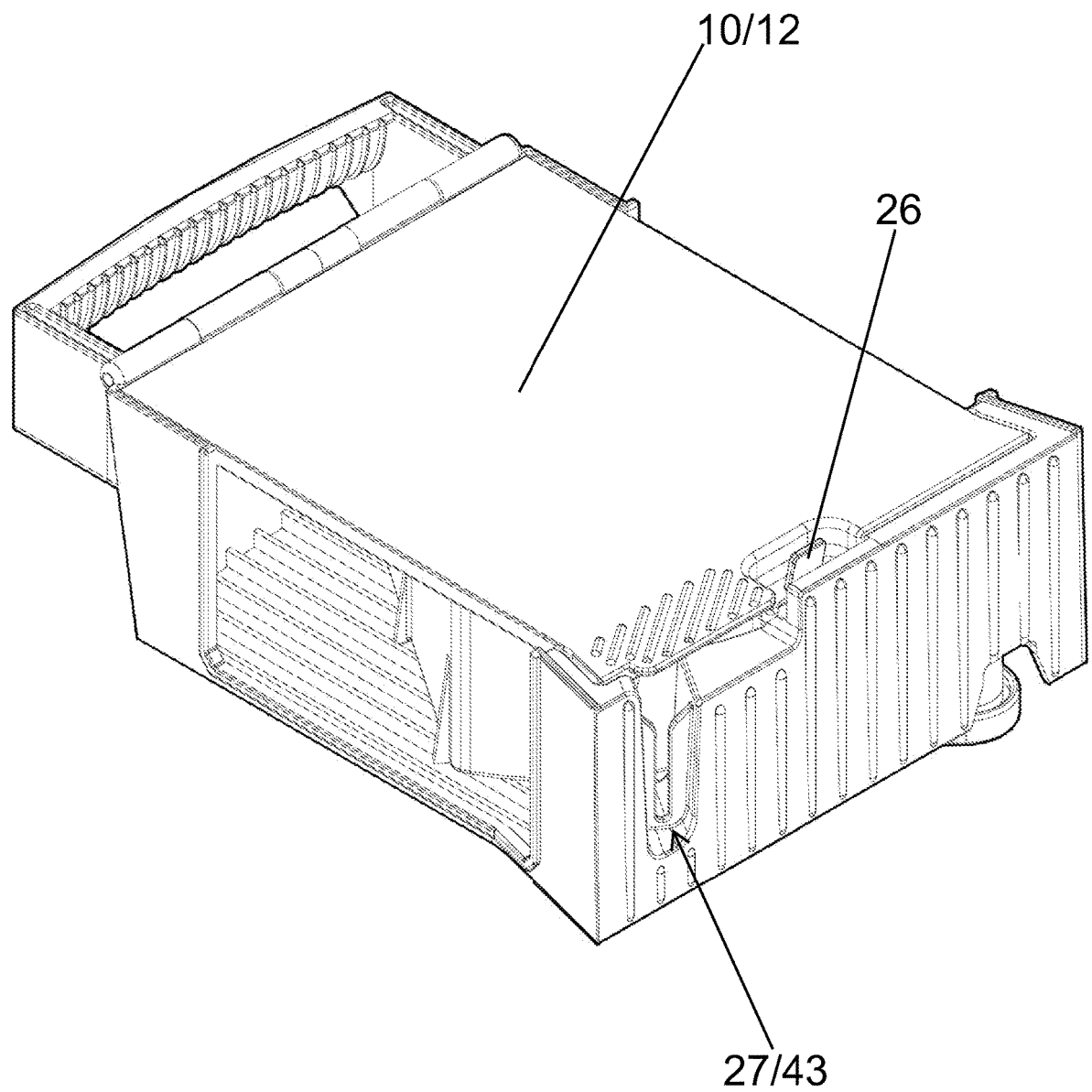
FIG. 5 is a perspective view of the device showing the top and side.
Figure 6:
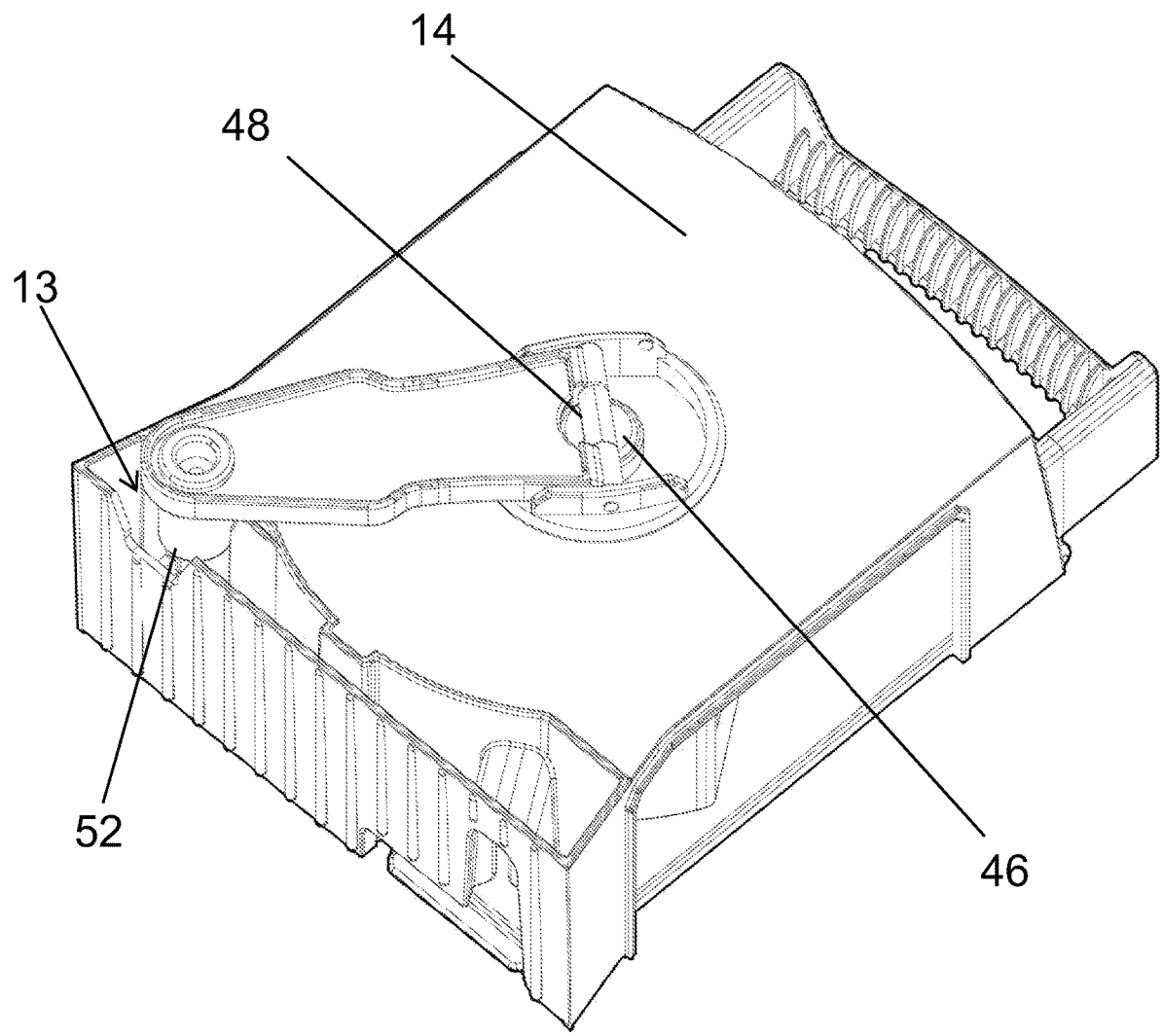
FIG. 6 is a perspective view of the device showing the back, side, and bottom of the device.
Figure 7:
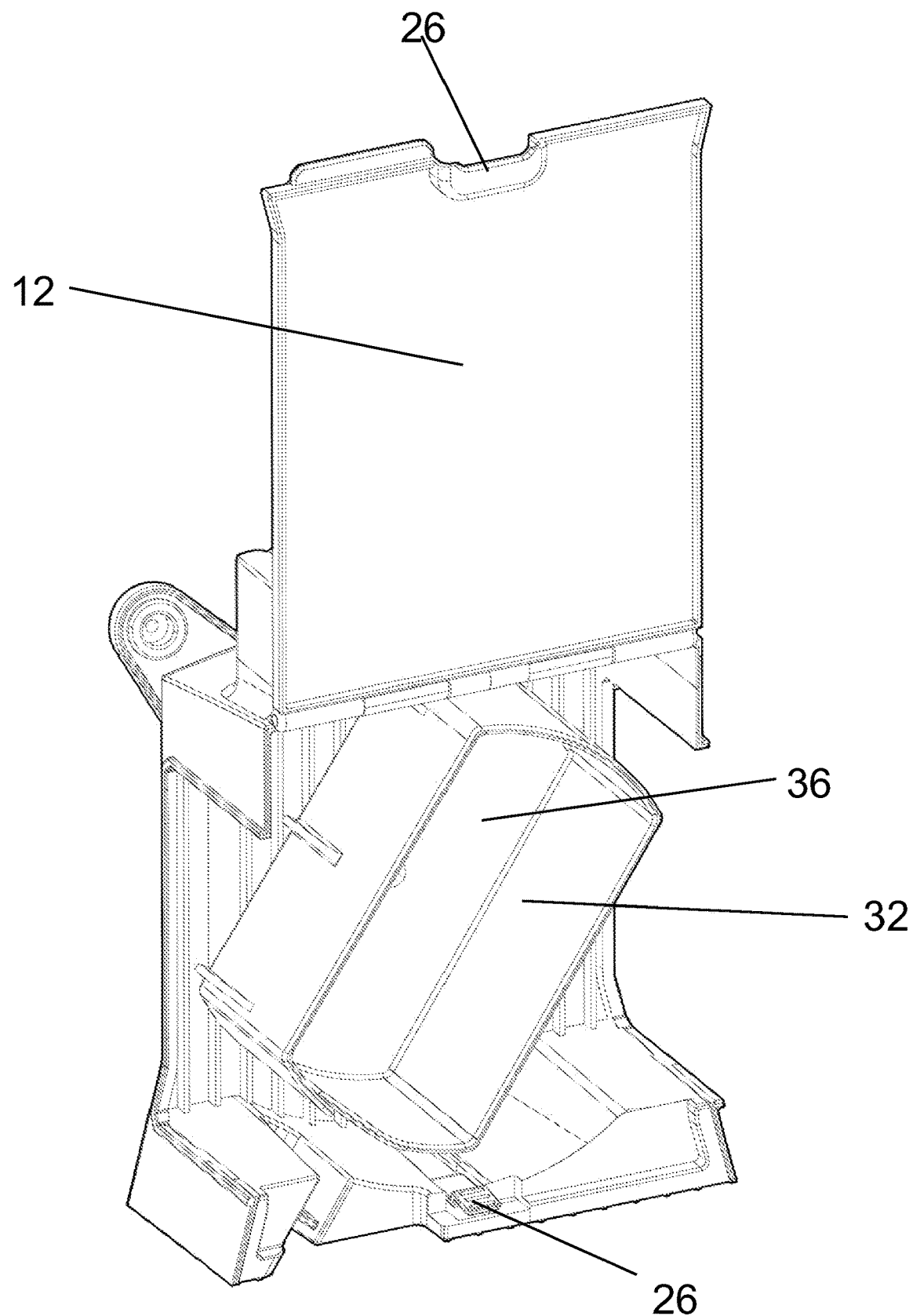
FIG. 7 is a perspective view of the device in an open position showing the top and side.
Figure 8:
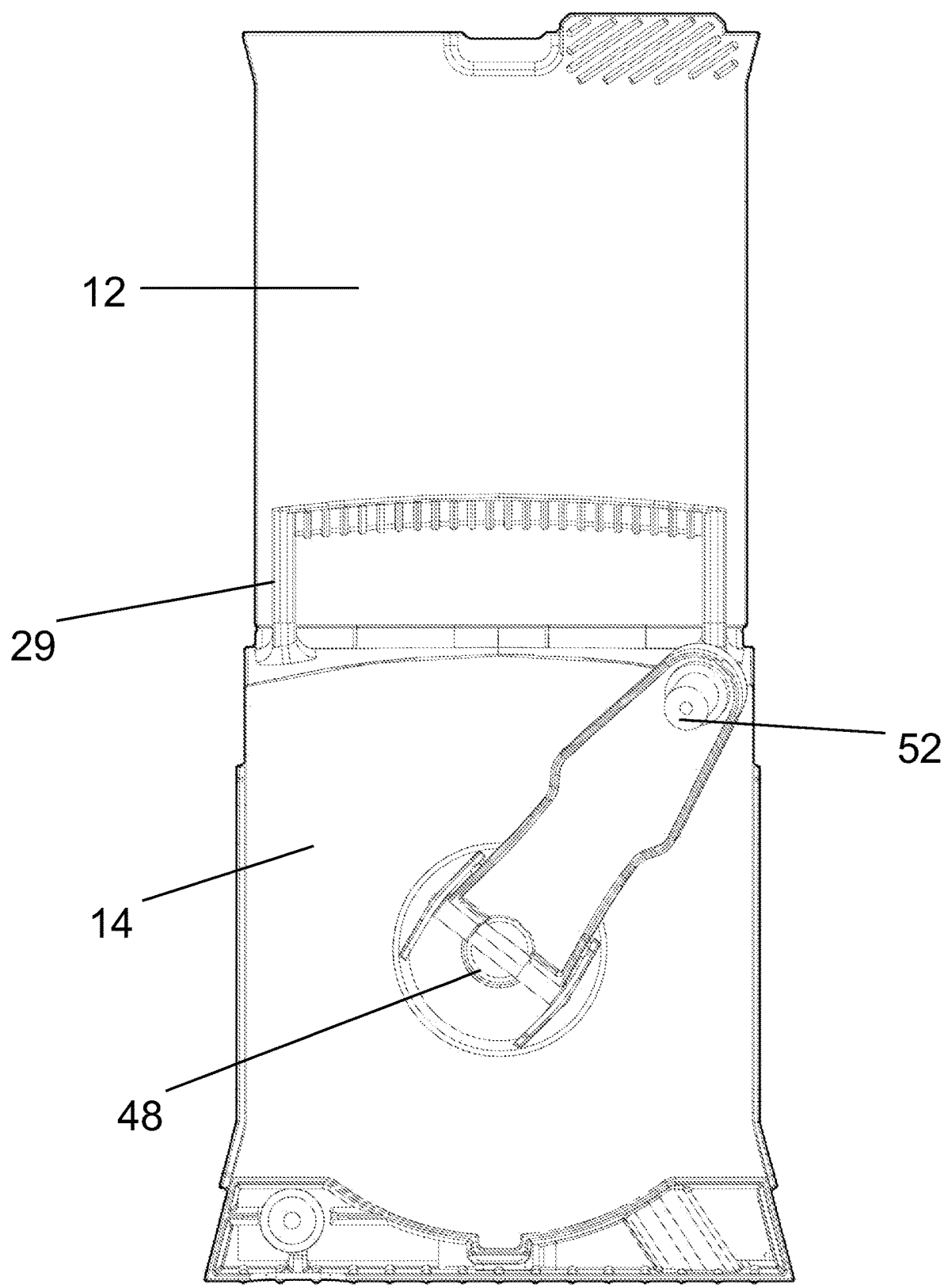
FIG. 8 is a top view of the device showing the back side with the top open.
Figure 9:
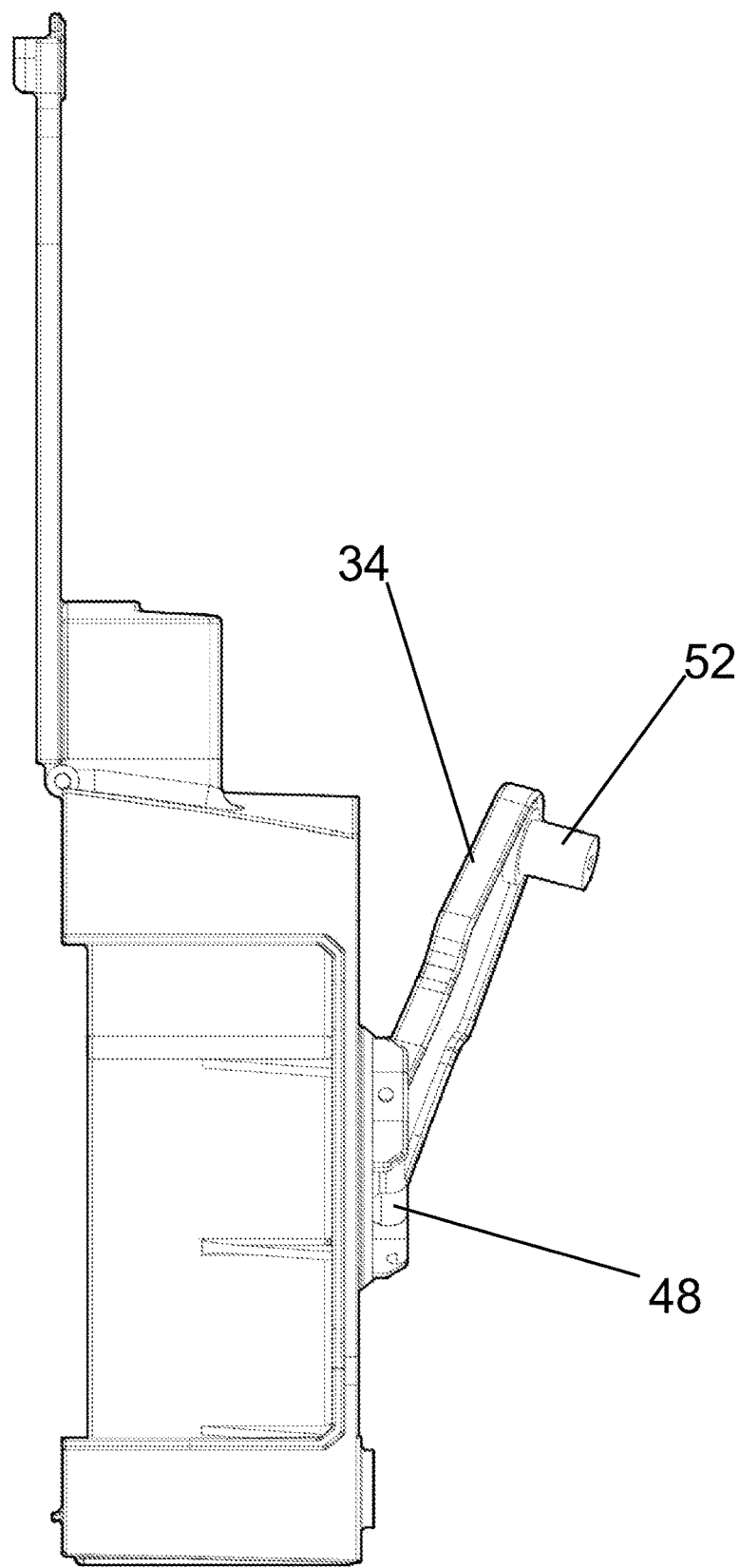
FIG. 9 is a side view of the device with the top open and winding arm risen.
Figure 10:
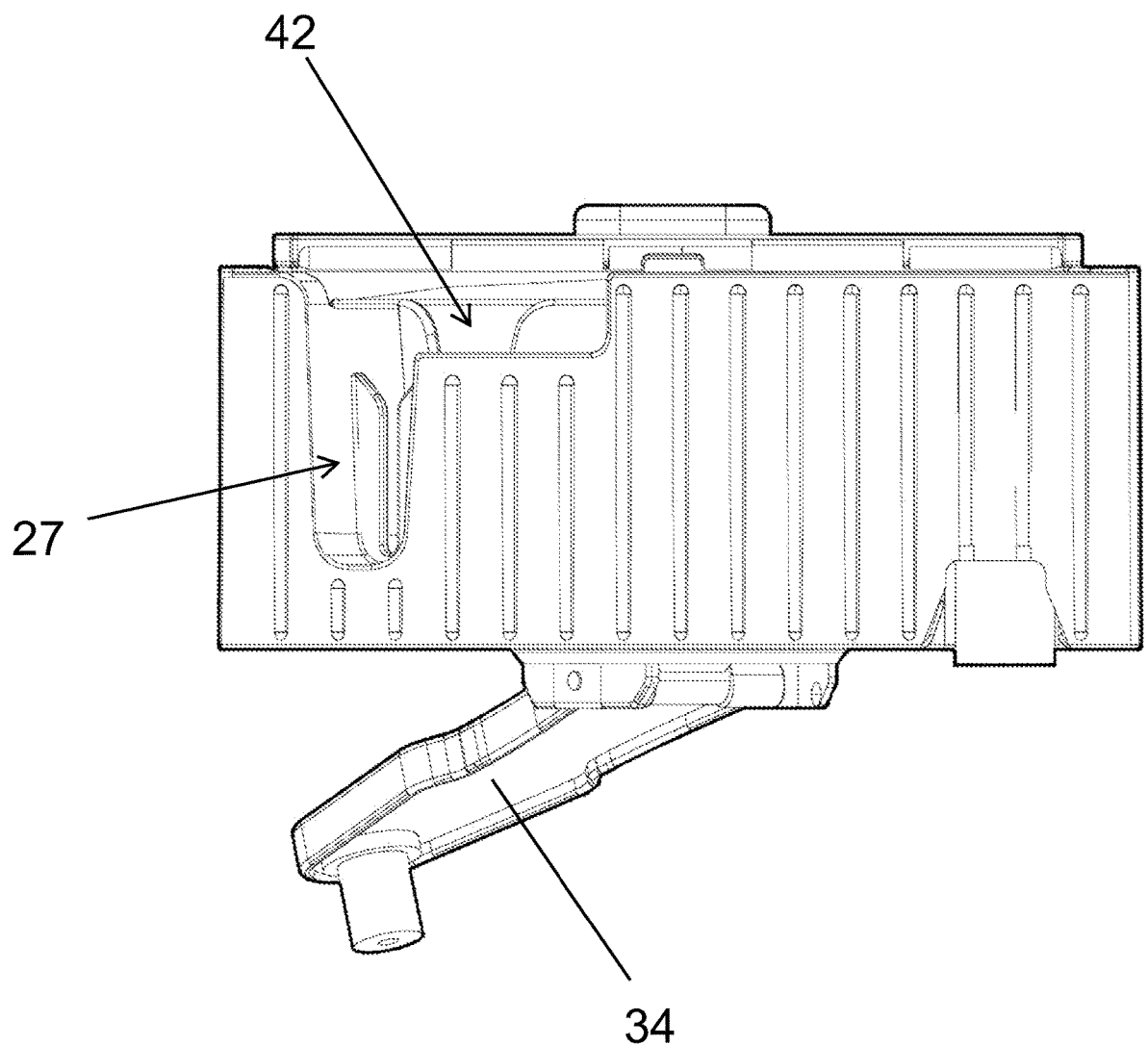
FIG. 10 is an end view of device with the winding arm risen.
Figure 11:
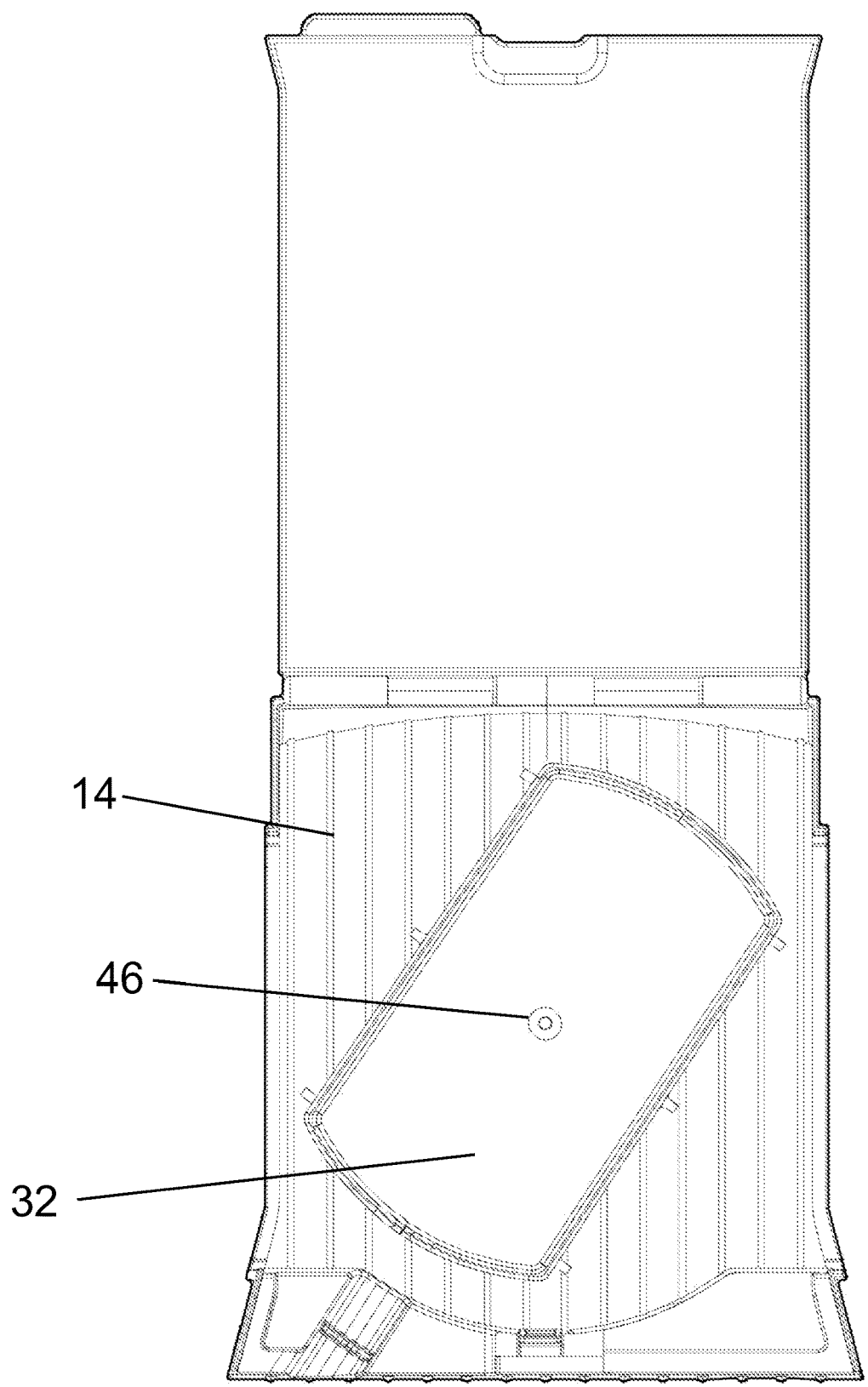
FIG. 11 is a top view of the device with the top open.
Figure 12:
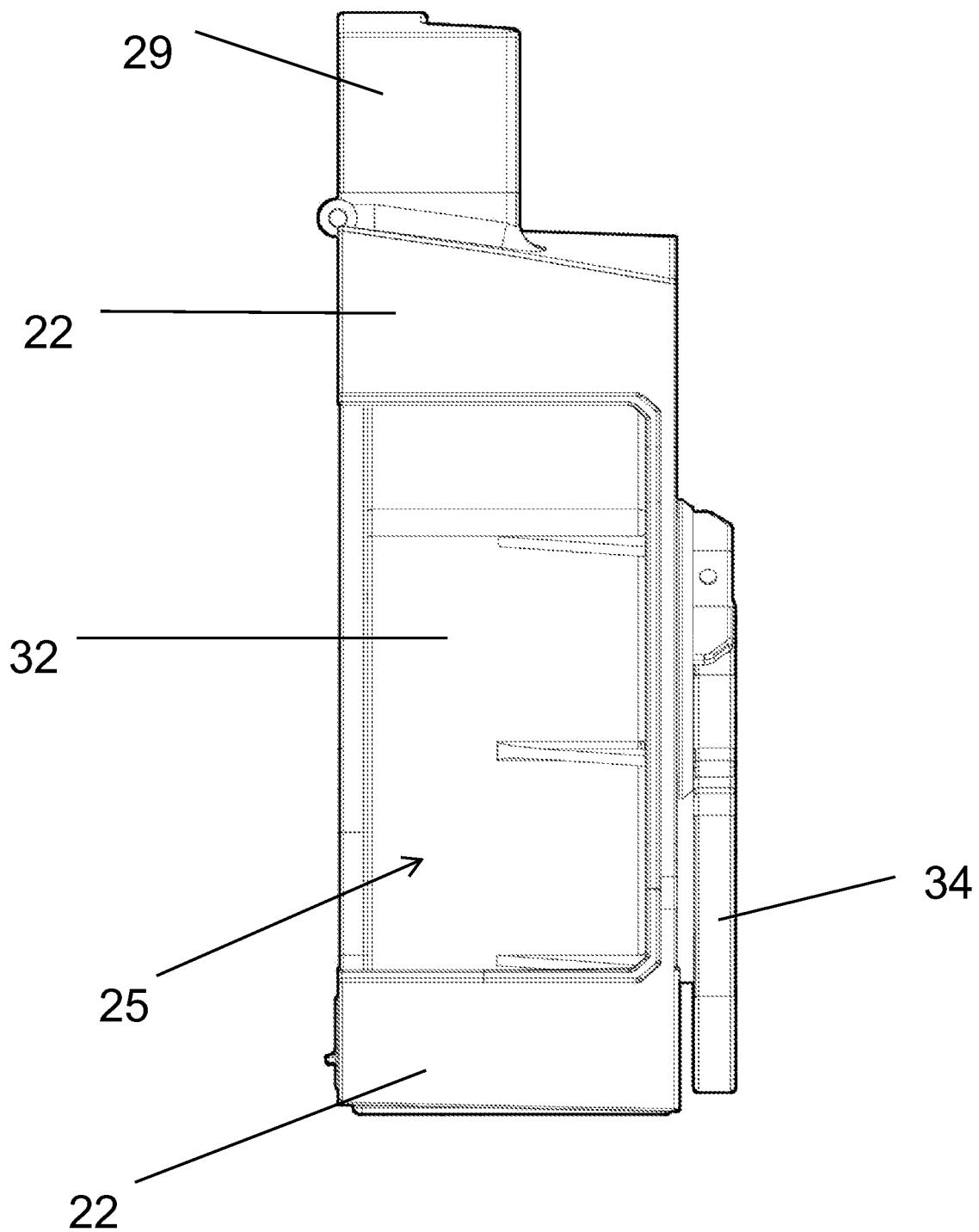
FIG. 12 is a side view of the device with top closed.
Figure 13:
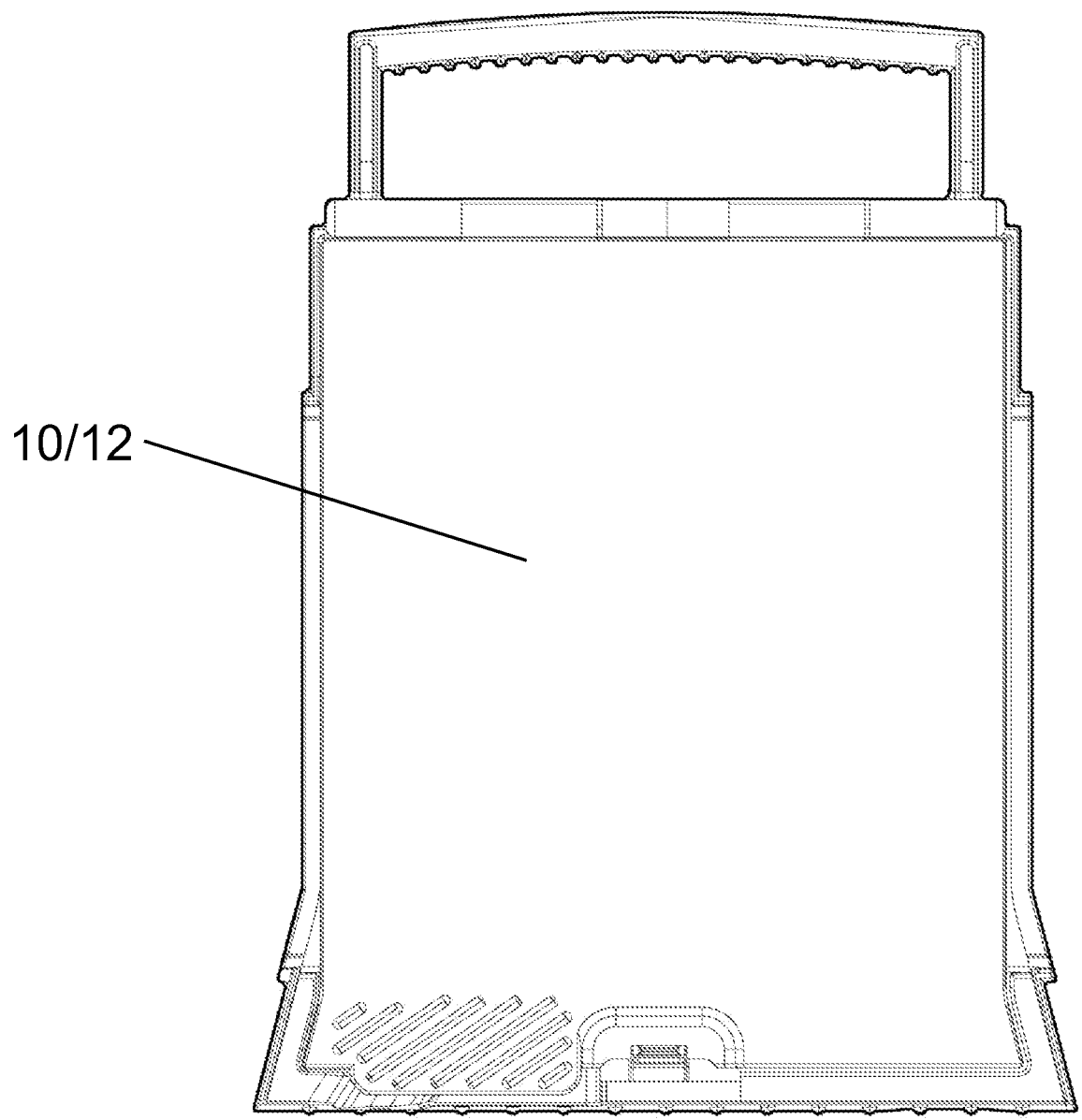
FIG. 13 is a top view of the device with the top closed.
Figure 14:
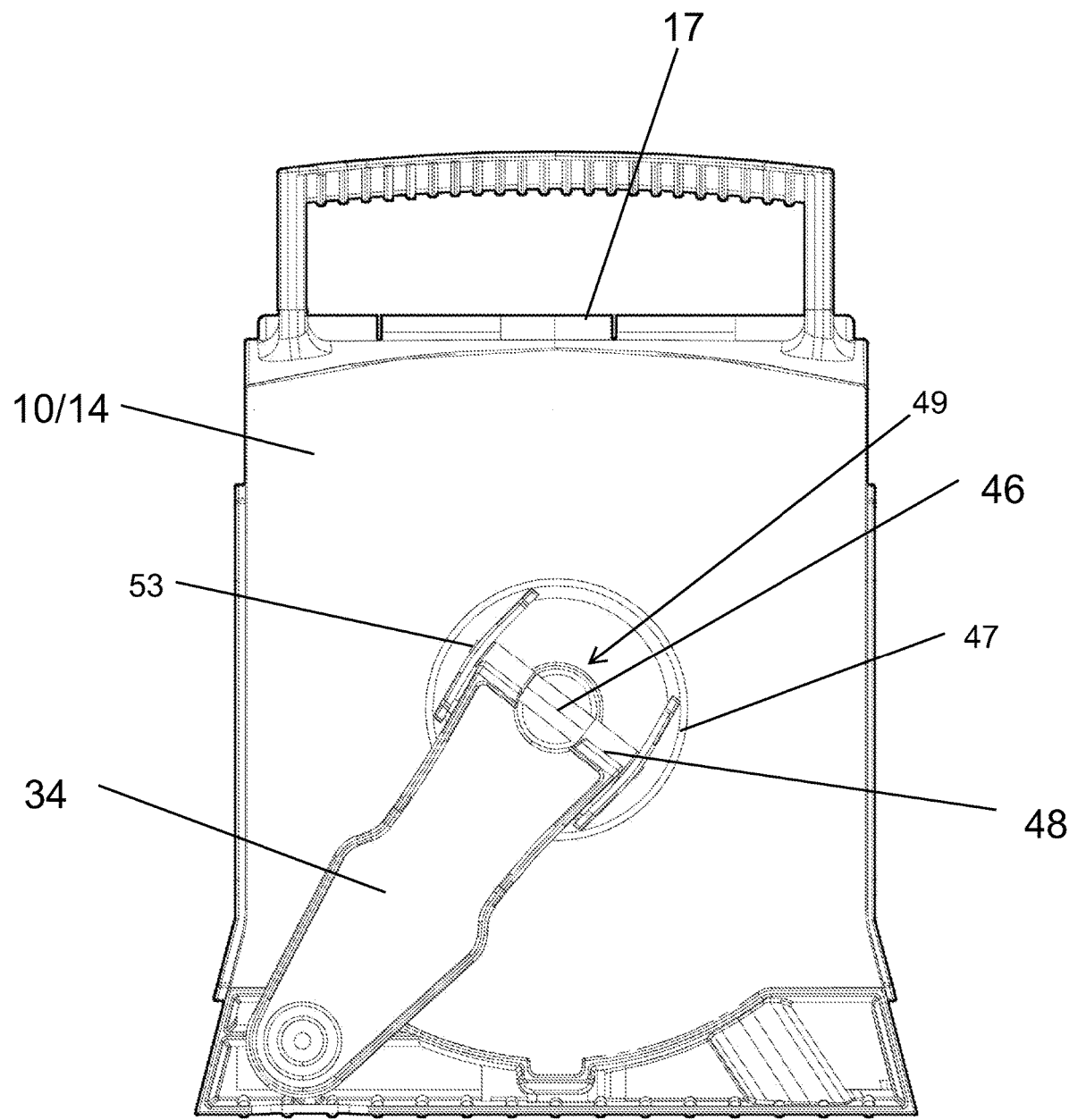
FIG. 14 is a bottom view of the device with the top closed.
Figure 15:
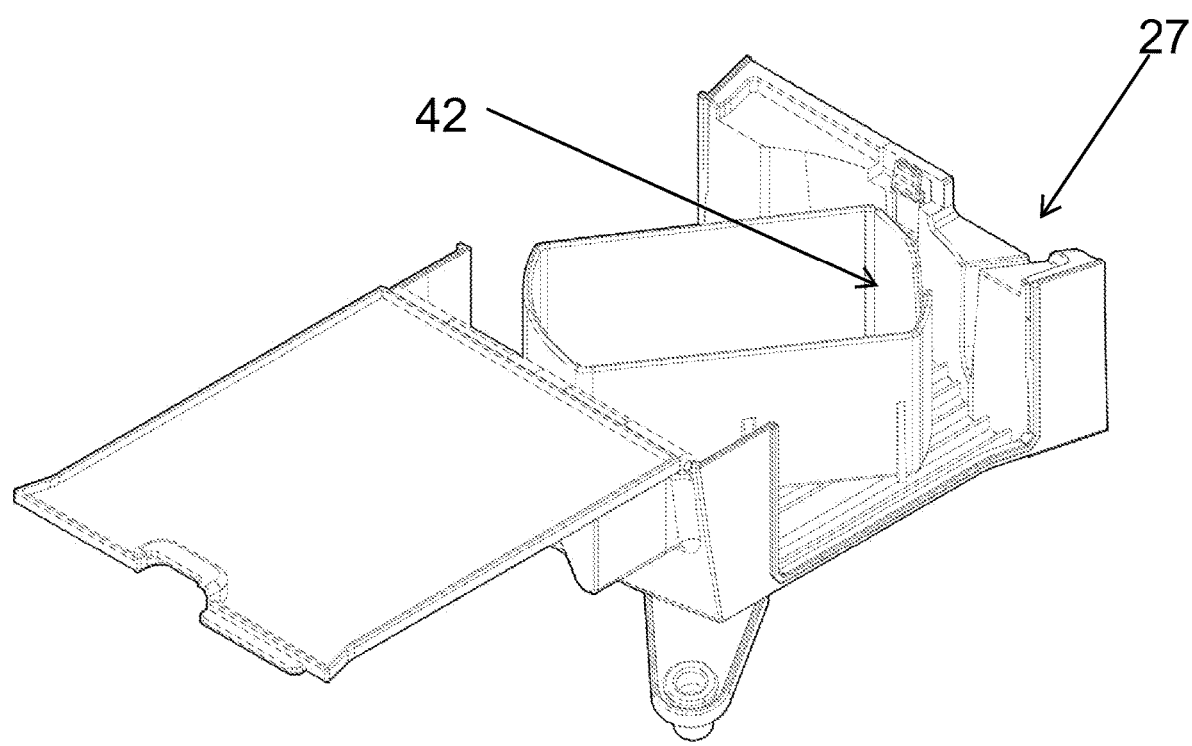
FIG. 15 is a perspective view of the device with the top open.
Figure 16:
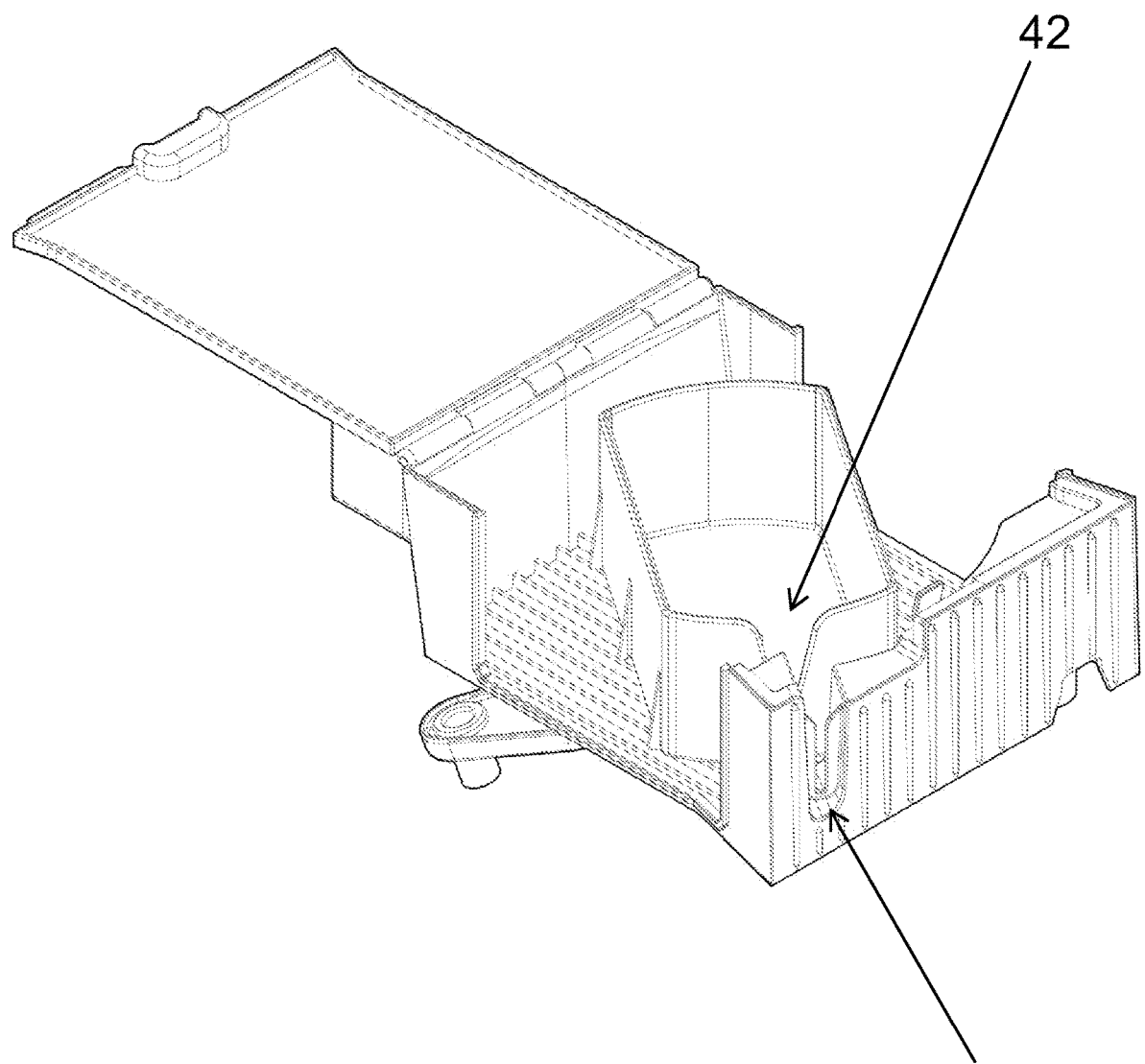
FIG. 16 is a top perspective view of the device in an open position.

The present invention will now be described more fully in detail with reference to the accompanying drawings, in which the preferred embodiments of the invention are shown. This invention should not, however, be construed as limited to the embodiments set forth herein; rather, they are provided so that this disclosure will be complete and will fully convey the scope of the invention to those skilled in the art.

FIGS. 1-26 illustrate a strap winding and storage device 100 according to the invention for storing a strap S and a securing device R. The device 100 includes a case 10 and a strap winder 30. The strap winder 30 has a storage area 32 that is rotatably positioned inside the case 10 and a winding arm 34 that is outside of the case 10, the storage area 32 and winding arm 34 moveably connected to one another through the case 10. Operating the winding arm 34 causes the storage area 32 to turn inside the case 10. The storage area is sized to contain the securing device R while the strap S is wrapped around outer sides of the storage area 32. The case 10 encloses the strap S and securing device R inside and around the storage area 32.

In practice, the securing device R is placed inside the storage area 32 and a strap S that is connected to the securing device R is placed through an opening or open end in the storage area 32. As a user operates the winding arm 34 the strap is wrapped around the outer sides of the storage area 32. In general, this disclosure discusses the inventive device 100 in terms of its use with a ratchet strap or tie down strap and an accompanying ratchet, however, it is understood that this use is only an example use and that the device 100 may also be used with other forms of straps and securing devices and other objects generally.

More specifically, the storage area 32 and winder 34 are connected through an opening 26 in the case 10 such that a user is able to operate the winding arm 34 from outside the device 100 to turn storage area 32 inside the case 10.

In the first embodiment, the case 10 has a top 12, a bottom 14, a first end 16, a second end 18, a first side 22, and a second side 24. The top 12 is connected to the first end 16 by hinges 17 and is connectable to the second end 22 so as to allow a user to open and close the top so as to access the inside of the case 10 and the storage area 32 and to secure the strap S when in the proper position. The top 12 is connectable to the second end 22 with a conventional fastening device 28 such as, for example, a clip.

Each of the first side 22 and second side 24 includes an opening 25. It is common, in use, for straps S and securing devices R to become wet and/or muddy/dirty. These openings 25 allow air into the case 10 to assist the straps in drying and, once dried, allow for any dried dirt/mud to fall out of the case. A case strap opening 27 may also be provided to allow the strap to be fed into the case while the top 12 is in a closed position. The case may also include a handle 29 for easy transportation. The handle 29 may be affixed using a number of suitable conventional means, for example, it may be affixed with a type of fastener such as a threaded fastener or it may be formed as a molded component.

The strap winder's 30 storage area 32 includes a bottom 36 and one or more sidewalls 38. First example, the storage area 32 may have a first sidewall 38A, a second sidewall 38B, a third sidewall 38C, and a fourth sidewall 38D. One or more of the sidewalls 38 may contain a storage area strap opening 42 to allow a strap to extend into/out of the, and/or the storage area may include fewer than four sidewalls. Together, the case strap opening 27 and the storage area strap opening 42 allow the securing device to be positioned inside the storage area 32 while attached to the strap S and have the strap extend out of both the storage area 32 and the case 10.

The storage area 32 is sized to fit within the case 10 in a manner that secures a conventional ratchet inside the sidewalls 38 while allowing a conventional strap to be wrapped around the outsides of the sidewalls 38 and within the case 10. The sides have a height that is slightly greater than the conventional strap, for example a device 100 that is constructed to contain a 2-inch strap may have sidewalls 38 that are approximately 2.25 to 2.5 inches in height, and when the outer case is closed the top 12 is very near to the top of the storage area's three sidewalls so as to effectively act as a cover to the storage area 32.

As noted, the winder 30 extends through an opening 26 in the bottom 14 of the case 10, where the storage area 32 is connected to the winding arm 34 by a swivel rod 46. Turning the winding arm 34 causes the swivel rod 46 to turn which rotates the storage area 32. The winder arm 34, swivel rod 46, and storage unit 32, are connected to one another using conventional means. For example, the swivel rod 46 may be a molded component that is shaped to match the opening 26 and is sized to fit tightly but moveable inside the opening, the swivel rod 46 having a lip 47 that is slightly wider than the opening to prevent the swivel rod 46 from falling or being pulled through the opening 26. The swivel rod also has a connector opening 49 that allows a fastener 51, such as a threaded fastener, to pass through the swivel rod 46 and secure the swivel rod to the storage area 32. The winding arm 32 is connected to the swivel rod 46 by a hinge pin 53 which allows the winding arm to move up and down in the vertical plane but creates a fixed connection in the horizontal plane. With an opposite end of the swivel rod 46 fixed against the storage area the result of turning the winding arm 34 is that storage area 32 is turned in the same manner.

Placing a portion of a strap around the storage area 32 and turning the wind arm 34 causes the strap to wind around the storage area 32. The winding arm may be connected to the swivel rod by a hinge 48 and have a handle 52. This allows the winding arm to be elevated for easier operation and lowered for more convenient storage. When stored the handle 52 may be sized to fit within a notch 13 in the bottom 14 of the case 10.

One manner in which a user may stow a ratchet R and strap S in this embodiment is for the user to open the top 12 of the case 10 and use the winding arm 34 to line up the opening 42 of the storage area 32 with the opening 27 in the case 10. The user then inserts the ratchet R into the storage area. The strap S is either attached to the ratchet R when placed inside the storage area 32 or an end of the strap is inserted into the storage area 32 beside the ratchet R. The strap S extends out through both of the storage area opening 42 and the case opening 27. Then, the user simply closes the top 12 and turns the handle 52 to operate the winder 30 to wrap the strap around the sides 38 of the storage area 32. When the handle is locked the compartment is lined up with slot. Strap may be attached or not, if not hook H in compartment with ratchet—hook connected to strap—strap hangs out. Close lid, wind away. Bypass—unlock handle and make quarter turn adjust to point out of opening.

Figure 17:
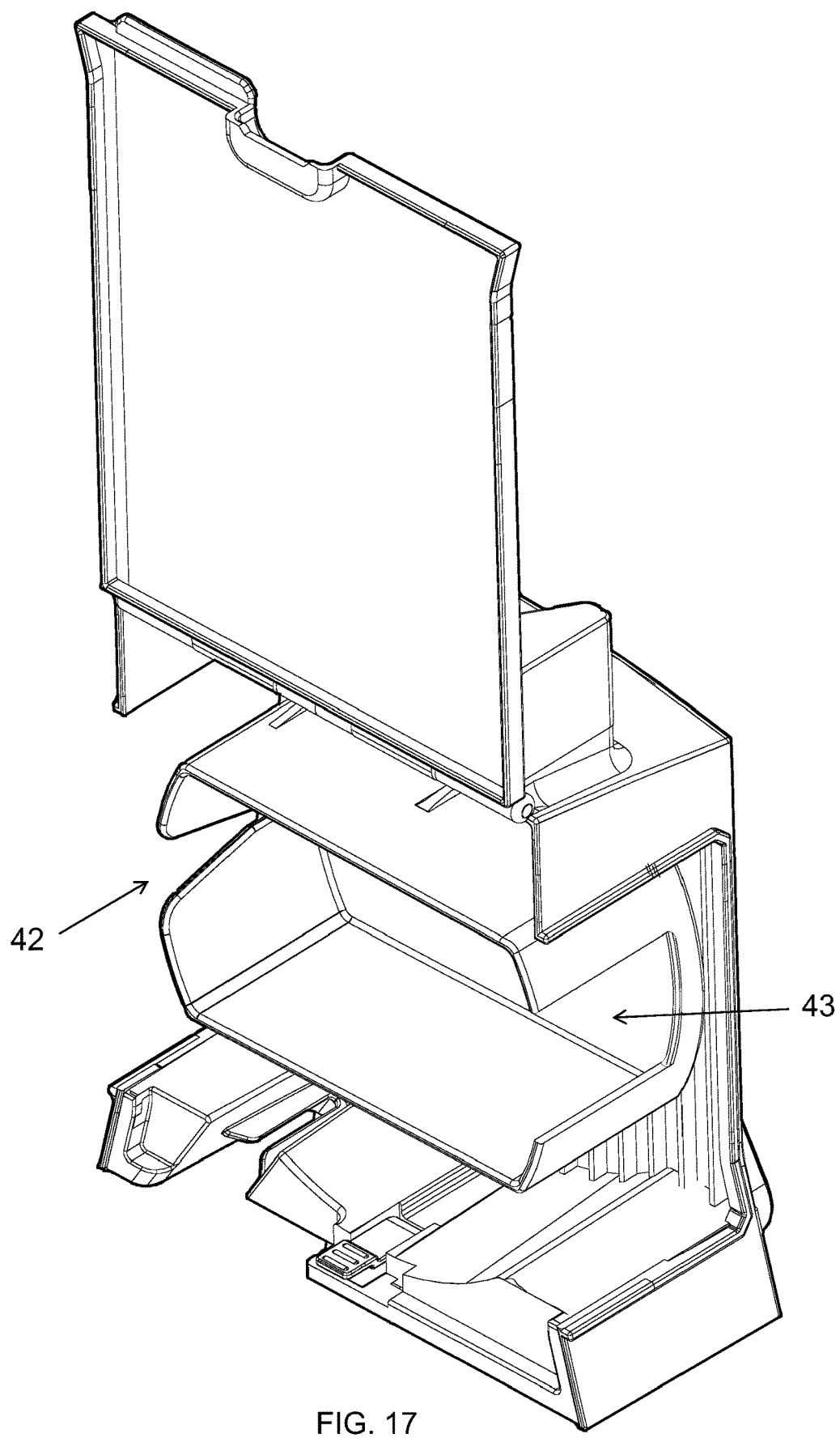
FIG. 17 is a top perspective view of the device in an open position having a storage compartment with two openings.
Figure 18:
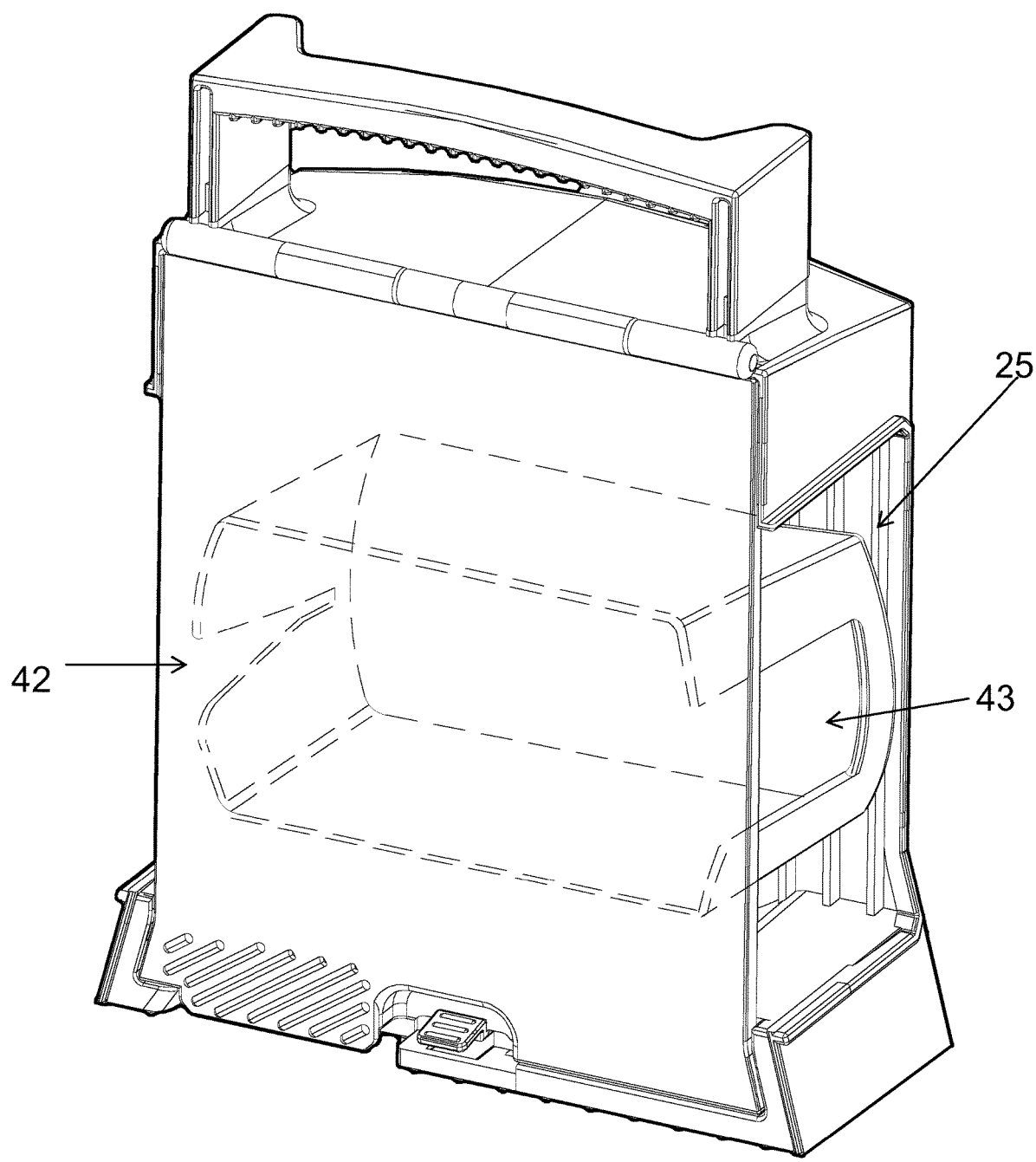
FIG. 18 is a top perspective view of the device with the top closed and the storage compartment having two openings.
Figure 19:
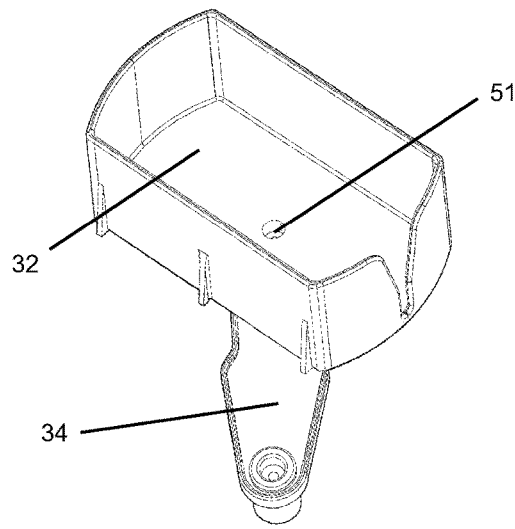
FIG. 19 is a top perspective view of the storage area and winding arm.
Figure 20:
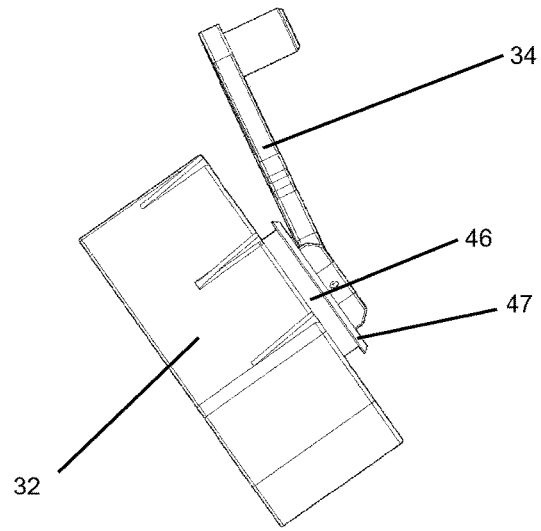
FIG. 20 is a side perspective view of the storage area and winding arm.
Figure 21:
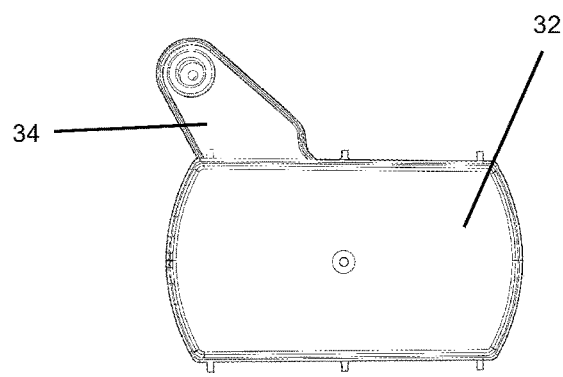
FIG. 21 is a top view of the storage area and winding arm.
Figure 22:
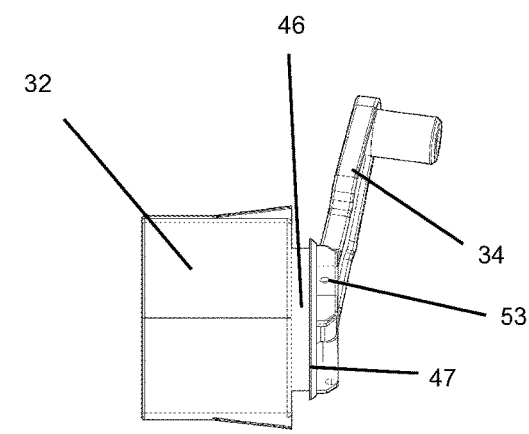
FIG. 22 is an end view of the storage area and winding arm.
Figure 26:
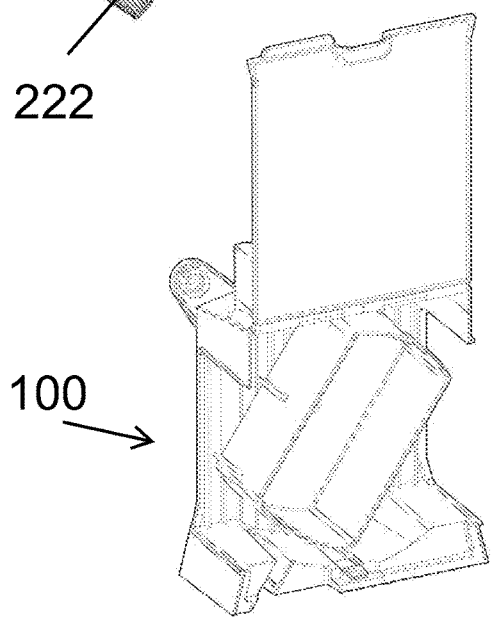
FIG. 26 is a perspective view of the device.

FIGS. 17, 18 and 26 illustrate a storage area that has a second opening 43 on the end opposite the strap opening 42. This opening 43 is wide enough to allow a ratchet to be inserted through the opening 43 so that the ratchet may be inserted into the device 100 while the top is closed by inserting the ratchet through one of the openings 25 in the case 10 and through the second opening 43 in the storage area 32.

In another embodiment, not shown, the case 10 has a first end 16 and second end 18 but is completely open on both sides. The case 10 may also be open, or have an opening on one side while being closed on the opposite side. The case 10 may also include two separate insertion slots 11 having different widths that are used to feed the strap into the container.

Figure 23:
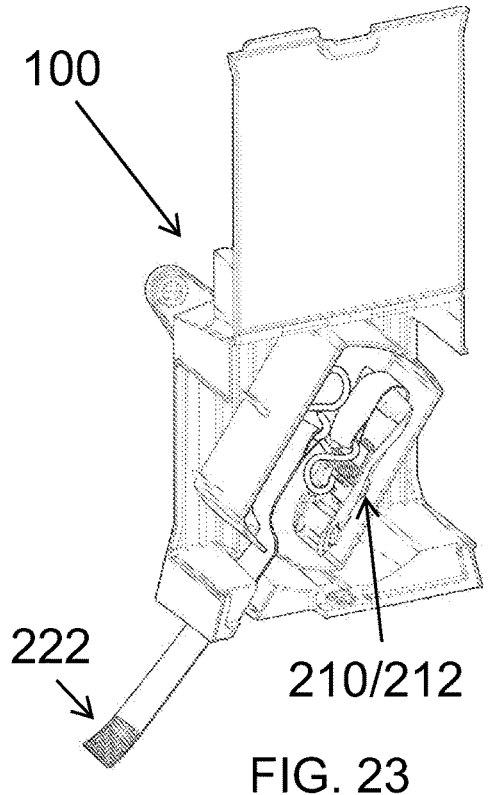
FIG. 23 is a perspective view of the device with a ratchet in the storage area and a strap extending out of the device.
Figure 24:
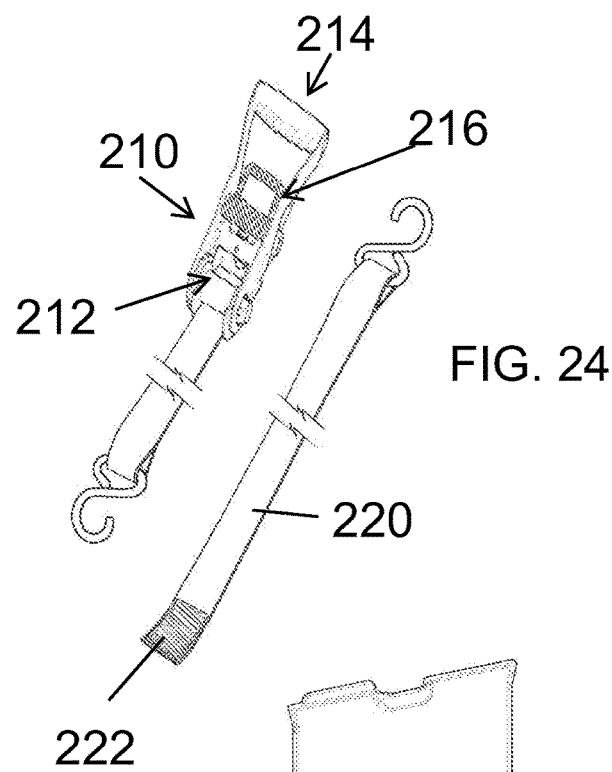
FIG. 24 is a perspective view of a ratchet and strap.
Figure 25:
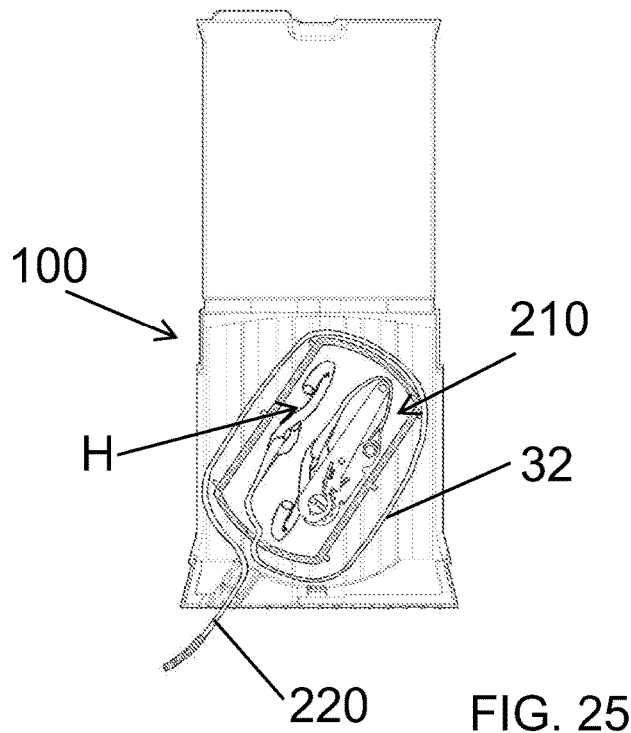
FIG. 25 is a top view of the device in an open position with a ratchet and strap inside.

An inventive ratchet 210 and strap 220 may also be provided as shown in FIGS. 23-25. The inventive ratchet 210, like all conventional ratchet's, has an opening 212 where an end of a strap is inserted in order for the ratchet to operate. In this embodiment, both the ratchet opening 212 and the end of the strap 222 that is to be inserted into the ratchet's R opening 222 have the same color so the user knows which end of the strap to insert into the ratchet. For example, both the ratchet opening 222 and strap end 212 may be colored yellow. The end of the strap 222 may also be treated with a material that causes it to have a greater degree of rigidity than the common strap, yet still have enough flexibility to bend or wrap around the storage compartment 32, allowing the strap to be easily inserted into the ratchet. The ratchet handle 214 may be color coated as well, primarily for ease of instruction, e.g. a user manual may instruct a user to operate the blue handle 214 in order to tighten the strap. Finally, the compression fitting or tension clip 216 on the ratchet, which acts as a release leaver, and the ratchet handle are different colors. In this manner, simple operational instructions may be provided, such as: press the red tab in and pull the yellow handle back to release the ratchet.

It is understood that the embodiments described herein are merely illustrative of the present invention. Variations in the construction of the winder and storage device may be contemplated by one skilled in the art without limiting the intended scope of the invention herein disclosed and as defined by the following claims.

What is claimed is:

1. A strap winding and storage device adapted to wind and store a strap and securing means, the strap winding and storage device comprising:
   a case and a strap winder, the strap winder having a storage area positioned inside the case that is configured to contain the securing means and that is moveably coupled to a winding arm positioned outside the case, and wherein the storage area and case are configured to hold the securing means inside the storage area and wrap the strap around the storage area inside the case;
   wherein the winding arm is connected to the storage area by a swivel rod, the winding arm connected to the swivel rod by hinges and having a handle on an end opposite the hinges.

2. The strap winding and storage device of claim 1, wherein the winding arm extends through an opening in the case to moveably couple to the storage area.

3. The strap winding and storage device of claim 2, the case further including a case base, a first case end, and a second case end, and the storage area further including a storage area base, a first storage area side, and a second storage area side.

4. The strap winding and storage device of claim 3, further comprising the case having a top that is adapted to be opened and to be closed, and when closed to be secured in the closed position atop the case.

5. The strap winding and storage device of claim 1, further comprising the case have a first side and a second side, at least one of the first side and/or the second side having an opening.

6. The strap winding and storage device of claim 1, further comprising the case having a strap opening on either the first end or the second end, the strap opening configured to allow the strap to be fed into the case and wound around the strap winder.

7. The strap winding and storage device of claim 6, the storage area having a first opening on an end of the storage area that is configured to allow the strap to extend out of the storage area.

8. The strap winding and storage device of claim 7, the storage area having a second opening on an end opposite the first opening that is configured to allow the securing means to be inserted into the storage area.

* * * * *